Oct. 19, 1926.
A. R. THÖRNBLAD
PACKING FOR PARACHUTES
Filed March 6, 1924
1,603,648
2 Sheets-Sheet 1
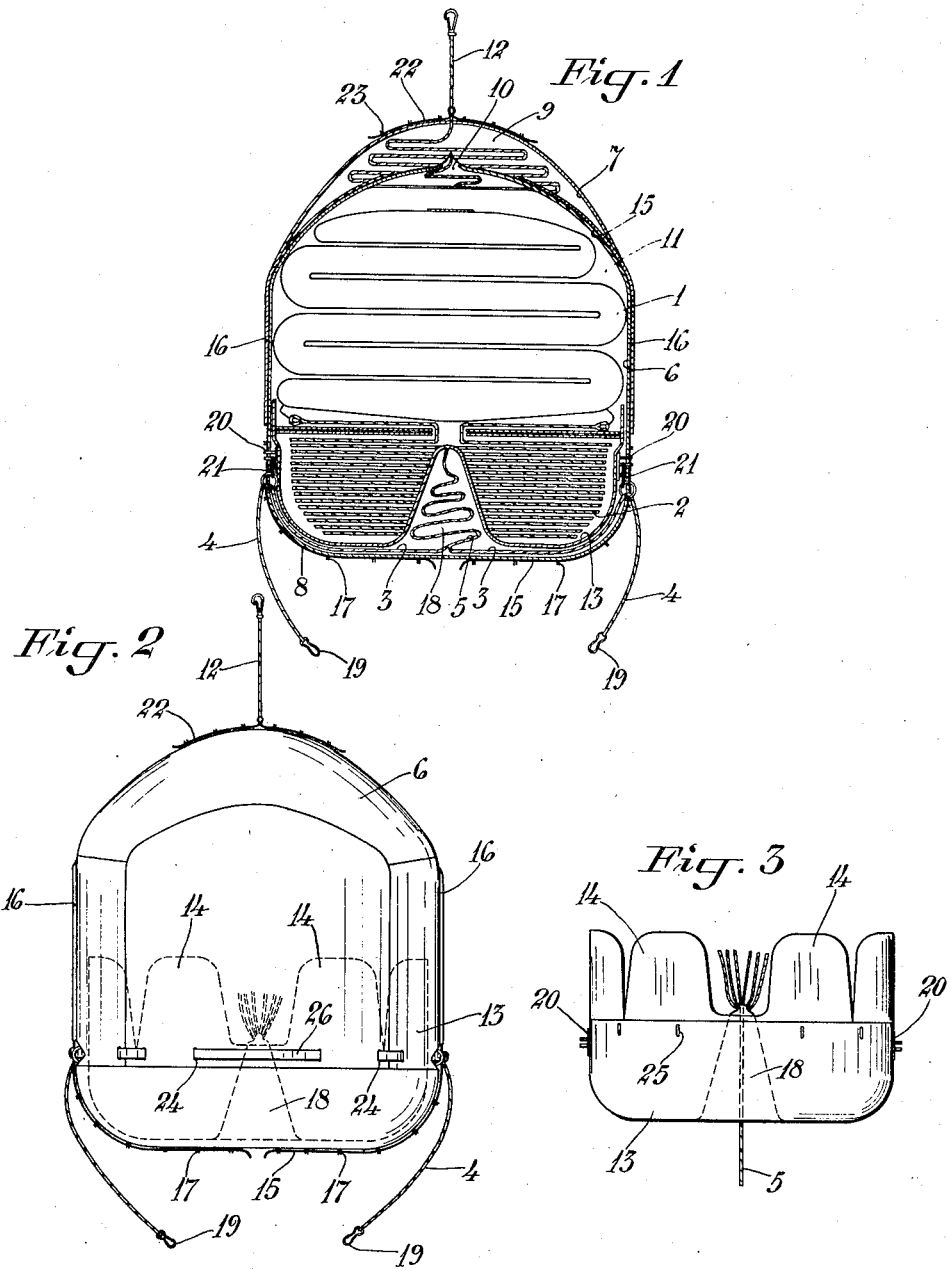

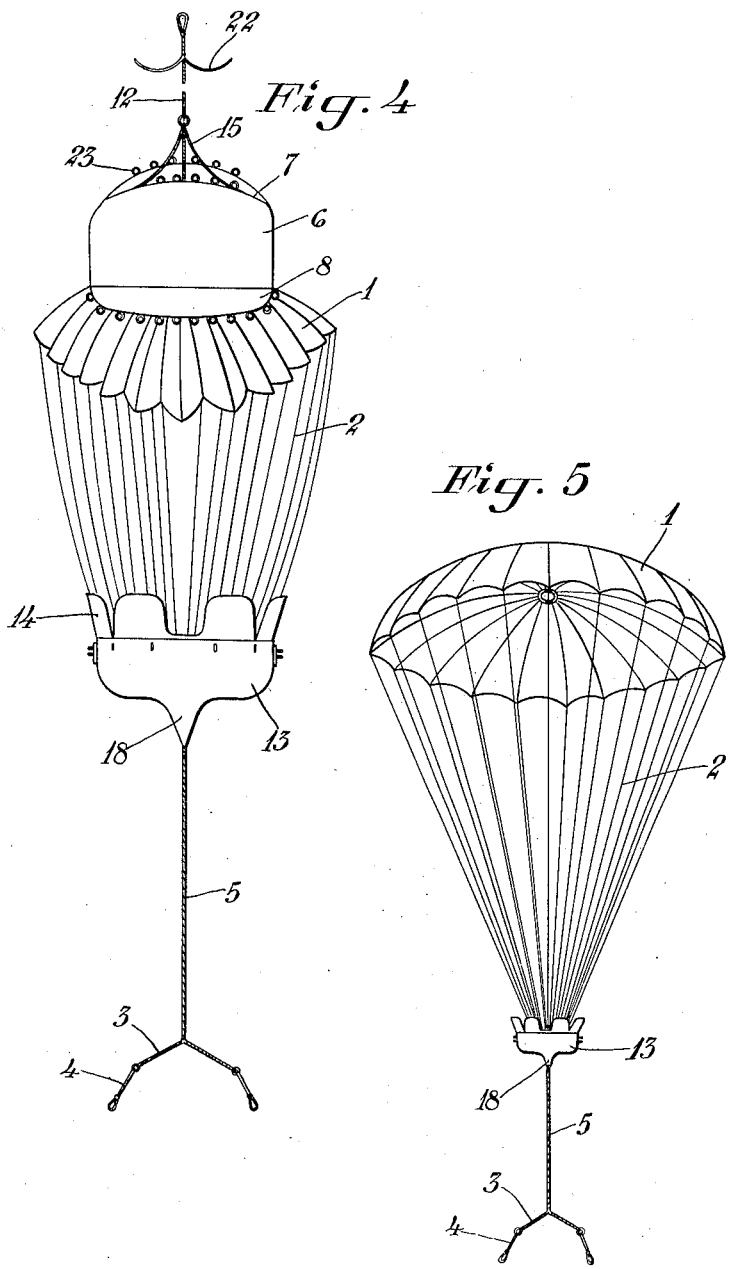

Patented Oct. 19, 1926.

1,603,648

UNITED STATES PATENT OFFICE.

AXEL RAOUL THÖRNBLAD, OF STOCKHOLM, SWEDEN.

PACKING FOR PARACHUTES.

Application filed March 6, 1924, Serial No. 697,373, and in Sweden March 5, 1923.

The parachutes heretofore known are all based on the principle of packing the parachute in a single container from which it is pulled out either through an upper or a lower opening, that is to say either "with the top foremost" or "with the base foremost." In both of these methods of opening the parachute, the air surrounding the falling parachute system counteracts the opening of the parachute in the horizontal plane in that, when the pulling out is taking place "with the top foremost," the air will act in a compressing manner on the body portion of the parachute during the whole of the time required for pulling out the body portion through the upper opening of the container, whereas, when the parachute is opened "with the base foremost," the weight of the falling load will act in a contracting way on the parachute body through the medium of the supporting lines, besides which the surrounding air will retard the opening of the parachute body owing to the rate of fall of the system. Thus the development of the parachute body will be impeded, or, the opening may perhaps fail altogether with disastrous consequences to the person performing a jump with the parachute for instance from an aeroplane.

The principal object of the present invention is to prevent such failure to open and to ensure a reliable and quick opening of the parachute body. To this end the invention consists in means for packing the parachute body and the supporting lines so as to permit the body portion to leave freely a casing or container surrounding same, preferably on the falling load having reached a certain distance from the point at which the jump started, and also a certain distance from the parachute body. This may be effected by packing the body portion and the supporting lines in two separate casings detachably connected with one another. Instead of the surrounding air counteracting the opening of the parachute body, as in the known types, the air will, in case of a parachute packing according to the present invention, aid and facilitate the expansion of the parachute in the horizontal plane, so that the body portion will be entirely opened before the parachute has yet commenced to carry the falling load.

In parachutes it is of the utmost importance to exclude every risk of the expanding parachute body coming into contact whilst falling with the aircraft or any part thereof. The expansion of the parachute body should take place only after the parachute has left the so-called danger zone, that is to say the space in the immediate proximity of the aircraft. In parachute constructions heretofore known sufficient regard has not been paid to this important demand. Generally, the line connecting the parachute with the aircraft is coiled up in the aircraft so that, should this line catch on any part of the aircraft, the same will pull the parachute out of its packing casing soon enough to incur the risk of the parachute body becoming entangled in some part of the aircraft in the course of opening.

A further object of the invention is therefore to remove this inconvenience which may be disastrous in the use of the parachute, and to this end the invention consists in packing means for the developing line connecting the packed parachute with the aircraft or the like, said packing means being preferably a pocket on the casing or container in which the body portion and the supporting lines are packed. By this full security is attained against the parachute becoming entangled with the aircraft so that the risk of an accident for this reason is entirely eliminated.

However, in parachutes it is also of the utmost importance not only to eliminate the risk of the parachute becoming entangled with the aircraft or with any portion connected therewith when the parachute is brought to function, but also to cause the parachute system to be at such a distance from the falling load, prior to the commencement of the opening of the parachute, that the parachute cannot become entangled with the load.

A further object of the invention is therefore to provide a parachute securing a quick and reliable opening of the body portion, while every risk of the parachute becoming entangled with the falling load is obviated. To this end the invention consists in a line connecting the supporting lines with the falling load and running out in the use of the parachute and packing means for said line, said packing means being preferably the same container in which the supporting lines are packed. By this it is attained that the falling body is separated during the fall from the parachute system or the supporting lines before the body portion starts to open and before the fall of the load is checked by the parachute, the falling load and the packed parachute being first separated from the aircraft, and then the falling load separated from the packed parachute, the opening of the latter taking place during the last portion of the last-mentioned movement.

A further object of the invention is to bring about a method for packing the parachute so as to secure for the parachute body leaving freely the casing surrounding same and to secure against the parachute becoming entangled with the aircraft as well as to secure for the falling load being separated from the parachute system or the supporting lines during the fall before the body portion starts to open and before the fall of the load is checked by the said body portion.

With the above objects in view the invention is embodied in preferable form in the device hereinafter described and claimed and illustrated in the accompanying drawings, in which—

Figure 1 is a somewhat diagrammatic sectional view of a packed parachute.

Figure 2 shows an elevation of the same.

Figure 3 is a detail view of the lower container.

Figure 4 represents the parachute at the moment of opening, and

Figure 5 shows the parachute fully expanded.

The parachute system consists of the parachute body 1, preferably made of silk, the supporting lines 2, the shock absorber 3 with the attaching ropes 4 and the connecting line 5. The body portion 1 is packed in an upper container 6 consisting of fabric and having the shape of a bag open at the top and the base, the said bag being provided with upper and lower flaps 7 and 8 respectively to close the openings. By means of fabric partitions the container 6 is divided into three compartments 9, 10 and 11, of which the two upper ones 9 and 10 are adapted to receive an opening line 12. When the parachute is packed, the topmost compartment 9 contains the major part of the line 12, or, such a length thereof as is required to permit the parachute in use to move off a sufficient distance from the aircraft before the body portion will expand, so that the opening of the parachute may take place without any risk of the same being entangled in the aircraft. The middle compartment 10 of the upper container 6 contains the remainder of the opening line 12 which is attached at its lower end to the upper container 6. The portion of the opening line 12 enclosed within the compartment 10 may then be extended through a fitting in the fabric partition separating the compartments 10 and 11.

The upper container 6 and the lower flaps 8 thereof are adapted to enclose a lower container 13, which is likewise made of fabric and adapted as a packing casing for the supporting lines 2. The lower container 13 is shaped as a bag open at the top, and is provided with flaps 14 adapted to be folded over each other so as to close the container 13 at the top. The two containers 6 and 13 are joined, when the parachute is in a packed condition, by means of a steel wire 15 extended through fabric grooves 16 or through rings provided on the sides of the upper container, the said steel wire being further extended through rings 17 sewn to the edges of the lower flaps 8. The steel wire 15 is, moreover, attached to the opening line 12 at a point between its upper longest portion and its lower portion serving, if desired, as a pulling cord. The bottom of the lower container is provided with an inwardly directed belly 18 to the top of which the supporting lines 2 are attached, and about which the lines are coiled up when the parachute is in the packed condition. Attached to the supporting lines 2 or to the top portion of the belly 18 is the connecting line 5, which is coiled up in the belly 18 when the parachute is packed and with which the shock absorber 3 is connected. The shock absorber 3 preferably consists of an elastic band or the like, the attaching ropes 4 provided with the hooks 19 being attached to the ends of the said elastic band or the like. Attached on either side of the lower container are fittings 20 adapted to receive rings 21 fastened to the shock absorber 3. The rings 21 are retained in their positions in the fittings 20 when the parachute is packed, the steel wire 15 being extended through apertures in the said fittings. The upper opening of the upper container 6 may be closed in such a manner that a steel wire 22 attached to the opening line at a suitable distance from the upper end thereof is extended through rings 23 attached to the edges of the upper flaps.

The packing of the parachute is effected as follows:—

Provided at the base of the lower flaps 8 of the upper container 6 are a number of holes 24, and at the base of the flaps 14, of the lower container 13 there are, likewise, arranged a row of holes 25. When the parachute is to be packed, a soft leaf spring 26, a metal wire, or even an ordinary cord may be extended through these holes 24, 25, the two containers being thus temporarily united to a single bag. The supporting lines 2 are then coiled up about the inwardly projecting belly 18, after which the flaps 14 of the lower container 13 are folded over the supporting lines 2. Then the body portion of the parachute is folded and inserted in the lowermost compartment 11 of the container 6, whereupon the connecting line 5 is coiled up and packed into the belly 18, after which the rings 21 are inserted in the fittings 20 and the steel wire 15 is extended through the fabric grooves 16, the apertures of the fittings 20, and the rings 17. The pulling cord or the lower portion of the opening line 12 is then coiled up and inserted in the topmost compartment 9 of the container 6, after which the upper opening is closed by the steel wire 22 being extended through the rings 23 sewn to the edges of the upper flaps 7. The parachute is now ready-packed, and the leaf spring 26 or equivalent device extended through the holes 24, 25 in the two containers may be pulled out, the parachute being then ready for use.

When the parachute is to be used, the same is attached by means of the hooks 19 to the body of the parachutist, and the upper free end of the opening line 12 is attached to the aircraft. When a jump is performed, the small steel wire 22 is first pulled out of the rings 23 under the influence of the falling load, whereby the uppermost compartment 9 of the container 6 is opened so that the opening line 12 may run out. On the portion of the opening line 12 contained in the compartment 9 having run out, and the same having been stretched, the steel wire 15 is pulled out of the rings 17 and the apertures of the fittings 20, this causing partly the opening at the base of the upper container 6 by the release of the flaps 8, and partly a release of the rings 21 from the fittings 20, so that the connecting line 5 may run out. The lower container 13 is then entirely separated from the upper contaner 6, the downward movement of the latter having been checked by the opening line 12 stretched out to the whole of its extent. As soon as the downward fall of the lower container 13 has caused the same to be separated from the upper container 6 remaining with the opening line 12, the body portion 1 of the parachute falls out of the upper container 6 and opens instantaneously, so that the said body portion will be wholly or partly opened before it starts to carry the falling load. The body portion 1, which is then opened "with the base foremost", is at the moment of expansion free from the influence of the weight of the load secured to the parachute. On account of the load falling at a greater rate than the parachute system, which latter offers greater resistance to the air, the load will thus be brought to a certain distance from the parachute system (equal to the length of the connecting line 5), so that the parachute system is prevented from becoming entangled in the falling load. As soon as the body portion 1 is completely expanded and the supporting lines 2 are stretched, the rate of fall of the load will be suddenly checked, the shock being taken up by the shock absorber 3, after which the load carried by the parachute descends to the ground at a low speed. As mentioned above, the upper container 6 and the opening line 12 remain hanging to the machine.

A parachute packed according to the present invention ensures a reliable and quick opening of the parachute body, so that the risk of accident is entirely eliminated. In addition to this advantage, the invention also has the advantage of the construction of the parachute or of the method of packing the same into the container or the containers being so simple that no long practice is required for a pilot to learn the correct manner of packing the parachute which only requires a short time for being done. Moreover, with a parachute constructed according to the invention no special or expensive arrangements are required in the aircraft on which the parachute is to be used. Nor are any special instructions required to perform a descent, in that all one has to observe in a descent when equipped with a parachute according to the invention is to throw oneself out of the aircraft, after which the parachute will operate automatically.

What I claim as new and desire to secure by Letters Patent of the United States of America is:—

1. In a parachute the combination with a body portion and supporting lines adapted to carry the falling load, of a casing adapted to receive said body portion and said supporting lines, an opening line normally connecting the casing with the aircraft and means controlled by said line for opening said casing so as to permit said body portion to open before the supporting lines are drawn out from the casing in their entire length.

2. In a parachute, the combination with a body portion and supporting lines adapted to carry the falling load, of two separate casings adapted to receive said body portion and said supporting lines, an opening line normally connecting the casings with the air-craft and means controlled by said line for detachably connecting said casings to each other.

3. In a parachute, the combination with a body portion and supporting lines adapted to carry the falling load, of two separate casings adapted to receive said body portion and said supporting lines, means for detachably connecting said casings to each other, the walls of the one casing embracing and supporting the other casing.

4. In a parachute, the combination with a body portion, supporting lines adapted to carry the falling load, and a casing enclosing said body portion and said lines, of an opening line connecting the casing with the aircraft and packing means for said opening line.

5. In a parachute, the combination with a body portion, supporting lines adapted to carry the falling load, and a casing enclosing said body portion and said lines, of an opening line connecting the casing with the aircraft, and a pocket on said casing adapted to serve as packing means for said opening line.

6. In a parachute, the combination with a body portion, supporting lines adapted to carry the falling load, and a casing enclosing said body portion and said lines, of a line connecting said casing with the falling load and packing means for said connecting line.

7. In a parachute, the combination with a body portion and supporting lines adapted to carry the falling load, of two separate casings, the one casing being adapted to receive said body portion, whereas the other casing is adapted to receive said supporting lines, a line connecting said supporting lines with the falling load, an inwardly directed belly at the bottom of the casing in which the supporting lines are packed and serving as packing means for said connecting line, the supporting lines being coiled up around the said belly in the packed parachute.

8. In a parachute, the combination with a body portion and supporting lines adapted to carry the falling load, of an opening line connecting the parachute with the aircraft, a casing formed as a bag and open upwards and downwards, partitions dividing said bag into three compartments, one of which is adapted to enclose the body portion, whereas the other two are adapted to receive said opening line, and a second casing adapted to receive said supporting lines.

9. In a parachute, the combination with a body portion and supporting lines adapted to carry the falling load, of an opening line connecting the parachute with the aircraft, a casing formed as a bag and open upwards and downwards, partitions dividing said bag into three compartments, one of which is adapted to enclose the body portion, whereas the middle compartment is adapted to receive a minor portion of said opening line and the top compartment is adapted to receive the major portion of said line, and a second casing adapted to receive said supporting lines.

10. In a parachute, the combination with a body portion and supporting lines adapted to carry the falling load, of an opening line connecting the parachute with the aircraft, a casing consisting of a bag of fabric open upwards and downwards, fabric partitions dividing said bag into three compartments, one of which is adapted to enclose the body portion, whereas the middle compartment is adapted to receive a minor portion of said opening line, said portion serving as a pulling cord for contracting the fabric partition separating the middle compartment from the lowermost compartment, and the top compartment is adapted to receive the major portion of said opening line, and a second casing adapted to receive said supporting lines.

11. In a parachute, the combination with a body portion and supporting lines adapted to carry the falling load, of an opening line connecting the parachute with the aircraft, a casing in the form of a bag of fabric open upwards and downwards and adapted to receive said body portion, a second casing adapted to receive said supporting lines, means for embracing the second casing by the first casing, means for closing the first casing at the top and means for closing said first casing at the bottom.

12. In a parachute, the combination with a body portion and supporting lines adapted to carry the falling load, of an opening line connecting the parachute with the aircraft, a casing in the form of a bag of fabric open upwards and downwards and adapted to receive said body portion, a second casing adapted to receive said supporting lines, flaps at the bottom of the first casing adapted to embrace the second casing, rings at the edges of said flaps, grooves on the sides of said first casing, a wire attached to the opening line and adapted to be extended through said grooves and said rings when the parachute is packed in order to close the first casing at the bottom, flaps at the top of said first casing, rings at the edges of said flaps and another wire attached to the said opening line and adapted to be extended through said rings when the parachute is packed in order to close the first casing at the top.

13. In a parachute, the combination with a body portion and supporting lines adapted to carry the falling load, of two separate casings adapted to receive said body portion and said supporting lines, means for detachably connecting said casings to each other, means for embracing the one casing by the other casing and flaps at the top of said last-mentioned casing, said flaps forming a loose bottom between the two casings when the parachute is packed.

14. In a parachute, the combination with a body portion and supporting lines adapted to carry the falling load, of two separate casings. the one casing being adapted to receive the said body portion, whereas the other casing is adapted to receive the supporting lines, a line connecting said supporting lines with the falling load, a shock absorber connected with said connecting line and means for detachably fixing said shock absorber on one of the casings.

15. In a parachute, the combination with a body portion and supporting lines adapted to carry the falling load, of two separate casings, the one casing being adapted to receive the said body portion, whereas the other casing is adapted to receive the supporting lines, and means for temporarily uniting the two casings in packing the parachute, said means comprising holes at the base of the one casing and holes at the top of the other casing, said holes being adapted to receive a spring for temporarily uniting the two casings in packing the parachute.

In testimony whereof I affix my signature.

AXEL RAOUL THÖRNBLAD.